United States Patent [19]

Miller

[11] 4,349,710

[45] Sep. 14, 1982

[54] DOOR EDGE FOR ATTACHMENT TO A TRAIN DOOR AND THE LIKE

[76] Inventor: Norman K. Miller, 2B Governor Markham Dr., Glen Mills, Pa. 19342

[21] Appl. No.: 216,775

[22] Filed: Dec. 15, 1980

Related U.S. Application Data

[63] Continuation-in-part of Ser. No. 19,428, Mar. 12, 1979, Pat. No. 4,273,974.

[51] Int. Cl.³ .............................................. H01H 3/16
[52] U.S. Cl. .................................. 200/61.43; 49/26; 200/245; 200/279
[58] Field of Search ............... 200/61.43, 61.71, 86 R, 200/85 R, 85 A, 159 B, 245, 275, 279, 5 A; 49/26, 27, 28

[56] References Cited

U.S. PATENT DOCUMENTS

| | | | |
|---|---|---|---|
| 3,321,592 | 5/1967 | Miller | 200/86 R |
| 3,485,974 | 12/1969 | Wolf et al. | 200/275 |
| 3,617,666 | 11/1971 | Braue | 200/86 R |
| 3,718,791 | 2/1973 | Szablowski | 200/86 R |

Primary Examiner—A. T. Grimley
Assistant Examiner—Morris Ginsburg
Attorney, Agent, or Firm—Robert K. Youtie

[57] ABSTRACT

A door edge including an elongate hollow resiliently flexible body for securement to a door generally in the plane of the door, the body having an outer wall remote from the door of a cross-sectional configuration generally sinuous or corrugated, and a compression actuable switch extending longitudinally within the hollow body for actuation upon compression by a trough or depression of the sinuous outer wall.

13 Claims, 5 Drawing Figures

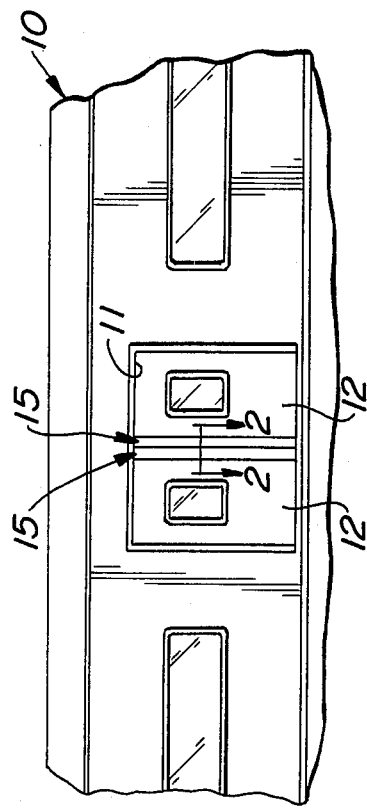
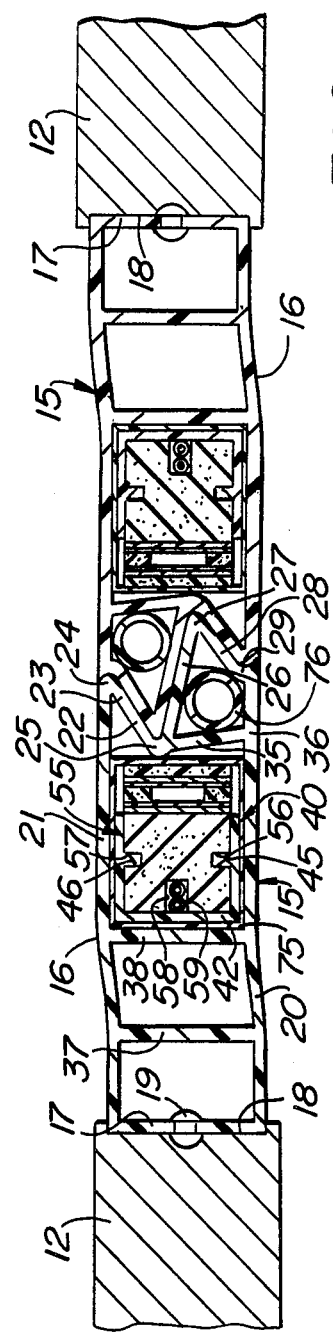

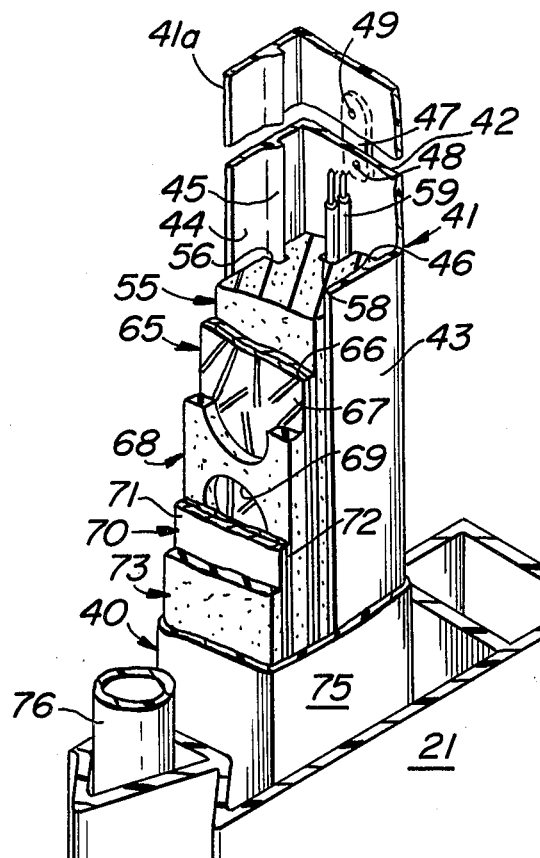
FIG. 3
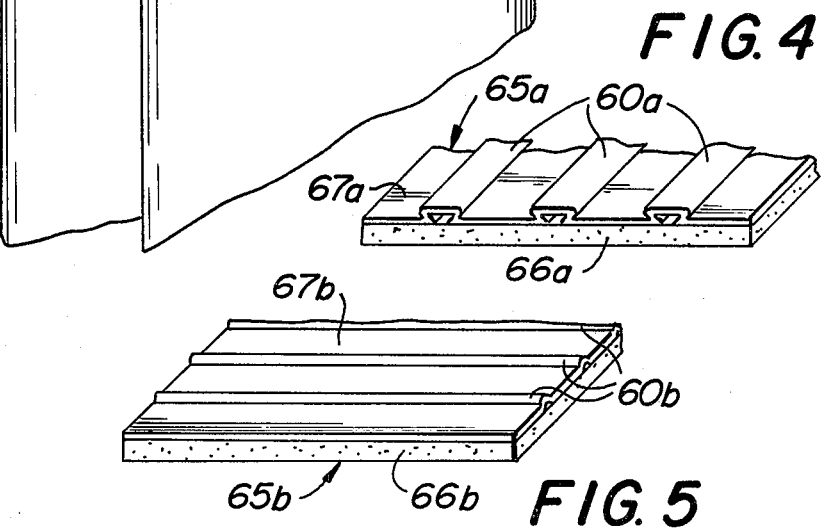
FIG. 4
FIG. 5

4,349,710

DOOR EDGE FOR ATTACHMENT TO A TRAIN DOOR AND THE LIKE

CROSS-REFERENCES TO RELATED APPLICATIONS

This patent application is a continuation-in-part of patent application Ser. No. 19,428, filed Mar. 12, 1979 entitled ELONGATE SWITCH CONSTRUCTION, now U.S. Pat. No. 4,273,974, issued June 16, 1981.

BACKGROUND OF THE INVENTION

In safety edges for the doors of trains and other public transportation, as well as public buildings, elevators, and the like, certain problems exist without satisfactory solution. Among the problems of prior art door edges of the type described are the requirements of excessive deflection and force in order to actuate the safety switch; the problems of satisfactory operation throughout wide temperature variations, both indoors and out; the limited number of cycles of operation without failure; the inability to isolate different environmental conditions, such as to retain interior heat in the winter and exclude exterior heat in the summer, as well as to exclude driving rain and other precipitation; and the inability in prior art structures to achieve a sufficiently interfitting or overlapping relationship while accommodating to misalignment and other variations in door construction.

SUMMARY OF THE INVENTION

Accordingly, it is an important object of the present invention to provide a safety edge structure for doors, as in public transportation vehicles, and the like, which are well adapted to meet the problems of door misalignment and construction variations; achieve a substantial interfitting or overlapping relation upon closure to effectively isolate environments on opposite sides of the door and exclude even driving rain and other precipitation; are capable of operation with a selected deflection and force throughout a wide range to achieve selected sensitivity; adapted for long life throughout many cycles of operation under widely varying temperature and other atmospheric conditions, and otherwise overcome the above mentioned difficulties.

It is a further object of the present invention to provide a door edge of the type described which is extremely well-suited for a wide variety of applications; and which may be highly fire resistant as being fabricated substantially of flame retardant material. It is a further object of the present invention to provide a structure which is highly resistant to humidity, so as to be substantially unaffected by humidity both as to operation and length of useful life.

A more particular object of the present invention is to provide an electrical contact structure which includes a precreased, crinkled or pleated sheet which is deflectable for closing a switch with an absolute minimum of internal stress so as to be extremely long lived.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a partial side elevational view showing a train incorporating doors constructed in accordance with the teachings of the present invention.

FIG. 2 is a partial horizontal sectional view taken generally along the line 2—2 of FIG. 1, enlarged for clarity.

FIG. 3 is a partial perspective view showing the door edge of the present invention apart from a door and broken away to illustrate interior structure.

FIG. 4 is a perspective view, in section illustrating a slightly modified embodiment of contact member.

FIG. 5 is a perspective view, broken away illustrating another embodiment of contact member in accordance with the instant invention.

DESCRIPTION OF THE PREFERRED EMBODIMENTS

Referring now more particularly to the drawings, and specifically to FIG. 1 thereof, a train or other public transportation vehicle is generally designated 10, and is provided with a doorway 11, in which are mounted doors 12 disposed generally vertically in coplanar relation and movable in their coplanar relation toward and away from each other. On their adjacent edges, the doors 12 are provided with safety edges or door edge structures 15.

The door edge structures 15 of each door may be identical, but in inverted relation, for purposes appearing presently.

Each door edge construction includes a hollow outer body 16 of elongate, substantially constant cross-sectional configuration, and disposed generally vertically in the illustrated embodiment. The outer body 16 is advantageously fabricated of resiliently deflectable material, such as by being extruded of polyvinyl chloride, or other suitable material. The body 16 is generally laterally elongate in the plane of its associated door, including an inner, or inner edge wall 17 located in facing engagement with the adjacent edge surface 18 of the door 12 and secured thereto by any suitable means, such as fasteners 19, which may be rivets, bar members or others. Extending in general parallelism with each other, from opposite edges of the inner wall 17, are a pair of side walls 20 and 21, which lie generally in the plane of the door 12. Extending between the side walls 20 and 21 remote from the door 12 and inner wall 17 is an outer wall 22. The inner wall 17 and side walls 20 and 21 are each generally flat. However, the outer wall 22, in cross-sectional configuration, is of a craggy or jagged sinuous, corrugated or toothed contour. More specifically, the outer wall 22 includes a wall portion 23 which extends from the terminal edge or bead 24 of side wall 21 obliquely inwardly toward the inner wall 17 and side wall 20 and terminates at its inner edge in a juncture or bead 25 spaced laterally between the side walls 20 and 21. From the inner edge or bead 25 of wall portion 23, there extends an intermediate wall portion 26, obliquely outwardly away from the inner wall 17 and toward the side wall 20, which intermediate wall portion terminates in an outer edge or bead 27 spaced between the planes of side walls 20 and 21. From the outer edge junction or bead 27 there extends obliquely toward the inner wall 17 and side wall 20 an additional wall portion 28, which terminates at an intersection or juncture 29 with the side wall 20. Thus, the obliquely angularly disposed wall portions 23, 26 and 28 combine to define the jaggedly sinuous outer wall 22, having a crest defined by the external angle between wall portions 26 and 28 and having a trough defined by the internal angle between wall portions 22 and 26, and extending between side walls 21 and 20. The intermediate wall portion 26 will be seen as spaced between the planes of side walls 20 and 21, with its opposite edges or junctures with the wall portions 23 and 28 being located on opposite sides of the center plane of the body 16. Further, the junctures or beads 25 and 27 are each approximately equally spaced from their adjacent side walls 21 and 20, respectively, and therefore equally spaced on opposite sides of the center plane of body 16, for a purpose appearing presently.

An internal guide wall, partition or web 35 extends from the inner edge or juncture 25 of intermediate wall 26 generally toward the far or distal wall 20 for intersection therewith at a juncture region 36. In particular, the web or wing member 36 extends from the juncture or bead 25 outwardly and obliquely away from the inner wall 17 toward the juncture 36 with side 20.

In addition, the resiliently flexible hollow elongate body is formed longitudinally internally thereof with a pair of inner and outer partitions 37 and 38, extending generally parallel to each other and generally normal to and between side walls 20 and 21. That is, the inner partition 37 extends in adjacent spaced relation with respect to inner wall 17, while outer partition 38 is spaced outwardly from inner partition 37.

In practice, the body 16 may be considered as composed of a base or mounting portion as defined by the walls 17, 20, 21 and 37, while the intermediate region defined by the walls or partitions 37, 20, 38 and 21 may define a flexural portion. The remainder or outer portion defined by the walls 38, 20, 22 and 21 may be considered as an active or operating portion.

Mounted within the active or operating outer portion 38, 20, 22, 21, extending longitudinally therewithin is a switch assembly, generally designated 40. The switch assembly 40, best seen in FIG. 2, may substantially completely occupy the space between side walls 20 and 21, and the space between wall or partition 38 and bead or internal ridge 25. Thus, upon inward deflection of the bead or ridge 25, the switch assembly 40 is substantially immediately compressed, without slack or lost motion.

The switch assembly 40 is best seen in FIGS. 2 and 3, and includes an elongate receiver or channel 41, which may have a degree of rigidity, but sufficiently flexible to efficiently serve its purpose. The receiver or channel may be fabricated of polyvinyl chloride as by extrusion, or of other suitable materials and methods. Included in the channel 41 are a generally flat bottom wall 42 adjacent to the outer partition 38 and a pair of side walls 43 and 44 generally parallel to each other, extending along opposite side edges of and outstanding from the bottom wall 42. The side walls 43 and 44 are respectively adjacent to side walls 20 and 21 of the hollow body 16. Internally of the side walls 43 and 44 are longitudinally extending ridges or shoulders 45 and 46, which may be bevelled outwardly toward the open channel side so as to face inwardly toward the channel bottom wall 42, in the nature of barbs.

The channel 41 may be continuous and longitudinally coterminous with the outer hollow body 16, or may be sectional, with the sections suitably articulated or linked together, as by a link member or strip 47 pivotally connected at its opposite ends to adjacent end portions of end to end channels 41 and 41a as by rivets 48 and 49, or other suitable pivotal connection. The link member 47 may be rigid or flexible, as desired; and, the link 47 may be omitted and the channels 41 and 41a configured for direct pivotal connection, if preferred. This articulation of adjacent end to end channel sections will permit the switch assembly 40 a degree of distortion out of straightness, say for accommodation to a door which is not straight, either by design or otherwise.

Conformably seated within and substantially fully occupying the space within the channel 41 is a switch cushion, seat or base 55, which may be an elongate resiliently compressible body, of suitable foam, say neoprene or other desired foam of a selected firmness for desired deflection. The switch base or cushion 55 may be of generally rectangular cross section, conformable to the interior of channel 41, and may project somewhat beyond the open outer side of the channel. Further, the cushion or base 55 may have its opposite sides provided with longitudinally extending grooves or slots, as at 56 and 57 for receiving respective ribs 45 and 46 in retaining relation with respect to the switch base. Further, adjacent to the bottom wall 42 of the channel 41, the base or cushion 55 is formed with a longitudinally extending groove or channel 58 for receiving wires 59 of the electrical circuit. The wires 59 are usually connected to the switch contacts at an end of the assembly, or other convenient location.

Seated on the outer surface of switch base or cushion 55, remote from the channel bottom wall 42, is an inner conductor member 65. The inner conductor member may be disposed in congruent facing relation with the base 55, and include a flexible backing sheet 66, say of asbestos or other preferably fire resistant fabric, and a conductive facing sheet 67, laminated to the backing sheet, and satisfactorily of aluminum foil, or the like. The aluminum foil 67 is preferably non-flat, say being crinkled, creased, pleated or the like, and in such non-flat condition laminated to the backing sheet 66, with a multitude of bends, creases or the like unsecured with respect to the backing sheet. Such structure, which will be described more fully hereinafter, permits of repeated flexure of the conductor member 65 with minimal internal stress, tension, torsion or the like, for greatly enhanced life of the conductive member without rupture or damage from fatigue, or otherwise.

On the outer side of the conductive member 65, on the conductive face 67, there is generally congruently located a spacer layer or separator strip 68, of suitably resiliently deflectable material, say plastic foam or other, and having through openings, such as holes 69 opening outwardly from the conductive facing 67. Advantageously, the material of spacer or separator 68 is flame retardant, such as treated latex, and the thickness and resilience may be selected to afford a switch of the desired characteristics.

Outward of and in generally congruent facing relation with the outer side of spacer 68 is an additional or outer contact member, generally designated 70. The contact member 70 may be essentially identical to the contact member 65, including a flexible backing layer 71 and laminated thereto, a flexible conductive layer or facing 72, advantageously pleated, creased, crinkled or folded, and laminated to the backing layer in the non-flat condition. Thus, the conductor member 65 and 70 are in facing spaced relation through the openings 69 of the separator 68 and deflectable into contacting engagement therethrough, as will appear presently.

Outward of the conductive member 70, say generally congruent thereto, is an outer switch cushion 73, which may be fabricated of suitably resiliently compressible foam to achieve switch sensitivity, as desired.

An enclosure or casing 75 of flexible sheet material, such as polyvinyl chloride film may entirely surround the switch components including the channel 41, base 55, conductive member 65, spacers 68, conductive member 70 and outer cushion 73. The flexible sheet of the outer enclosure or casing 75 is advantageously impervious, and completely sealed, as by radio frequency or other suitable sealing, to totally enclose and define a humidity barrier about the switch assembly 40.

The conductive members 65 and 70, and conductors or wires 59 are suitably connected in circuit to achieve stoppage of door operation, or door retraction upon contact between the switch conductors 65 and 70. This circuitry may be of the closed loop type or other circuit known in the art.

A desired stiffness, deflectability or sensitivity is designed and built into the switch 40 by the selection of appropriate materials, say of the base cushion 55, spacer 68 and outer cushion 73, and fabrication of the components, say by thickness selection of the cushions and spacer, and open work configuration of the latter. This may be considered as coarse tuning of switch sensitivity, and may be designed to achieve a medium or midrange of sensitivity, for subsequent fine tuning as will appear presently. Of course, the coarse tuning of switch sensitivity may be varied for different applications, as required.

With the switch assembly 40 in position in the hollow body 16, it will be apparent that depression of the outer hollow body wall 22, as by engagement with a passenger's hand, or other object, will immediately deflect the rib or bead 25 inward toward the door and against the switch 40 to compress the latter. Sufficient compression of the switch 40 will engage the conductor members 65 and 70 through the spacer 68 for closure of the switch. The switch engaging rib or bead 25 is guided inward by rotative or swinging action of internal web or guide member 35, to assure the desired switch closing response to deflection of the outer wall 22. As the guide web or swinging wall 35 does not swing over center, it will be appreciated that there is no appreciable force resisting inward deflection of the outer wall 22, but only the desired guiding action.

In the event that increased switch sensitivity is desired, a sensitizing or reinforcing member 76 may be extended longitudinally through and into the space bounded within the outer wall portions 26 and 28, the side wall 20 and the guide wall 35. The reinforcing member 76 may be a plastic tube having circular, triangular or other desired cross-section and of sufficient rigidity to slightly distend or expand the receiving walls 20, 26, 28 and 35, and thereby prestress the receiving walls. Thus, less deflection of the outer wall 22 will be required to effect closure of the switch 40. That is, the switch 40 is effectively preloaded, by partial compression of the separator 68, so that less deflection is required for actuation or closure of the switch.

In the event that greater deflection is desired to actuate the switch, there may be interposed a reinforcing member slightly smaller than the nose or space within wall portions 26 and 28, and wall 20 and 35, so that there is no preloading or partial deflection of the switch, but rather the reinforcing member may be somewhat rigid so as to spread the deflection load from the point of impact, so that a greater force will be required to effect switch actuation. That is, by spreading the otherwise concentrated force, a greater force is required to effect the switch deflection for actuation. The selection of reinforcing member or inserts 76 may, of course, vary in dimension and other physical characteristics, and may be considered as fine tuning of the door edge 15.

As best seen in FIG. 2, a pair of door edges 15 are substantially identical, but inverted with respect to each other, for complementary interfitting engagement of their outer walls 22. In this interfitting engagement, there is a substantial overlap of the nose beads 27, and complementary mating engagement of the wall portions to assure effectively sealed closure of the doors and isolation of environments on opposite sides of the doors. Also illustrated in FIG. 2 is a misaligned condition of doors 12, wherein the flexural laterally intermediate regions of bodies 16 are distended for proper alignment of the mating configurations of the outer walls 22. As the projections, crests or nose beads 27 are off center with respect to the door edge center plane, it will be appreciated that a variation in alignment between the doors may be accommodated by the degree of nose offset from the center plane. Further, proper mating interengagement of the sinuous or corrugated outer walls 22 is enabled by the medial flexural regions of the hollow bodies. Of course, the greater flexibility of the hollow bodies facilitates extrication of a person's limb, should such be necessary.

As with flexible structures supported along their length, the end portions are generally of greater flexibility, which may be overcome by stiffening inserts, as required.

Referring now to FIG. 4, there will be seen an enlarged partial view showing a conductor 65a, including a flexible backing strip 66a of asbestos, suitable fabric or the like, and a facing or conductive face material 67a suitably laminated to the backing. The conductive facing 67a may be of aluminum foil or other suitably conductive flexible sheet material, and is illustrated as formed with a plurality of pleats or folds 60a defining portions of the conductive foil bent or crinkled and unsecured to the backing. Thus, the conductive member 65a may be flexed without appreciable stress applied to the conductive facing for greatly increased life.

In FIG. 5 is shown another embodiment of conductive member 65b, including a suitable flexible backing sheet 66b and a facing sheet 67b of suitable conductive foil or the like. The foil or conductive facing sheet 67b is formed with a plurality of creases or bends 60b, which may be in the nature of crinkles, and the facing is laminated or secured to the backing in the crinkled condition, so that the crinkles or bends are unsecured with respect to the backing. Here also, the conductive member may be flexed with greatly reduced stress imparted to the conductive facing 67b for greatly enhanced life.

From the foregoing, it will be seen that the present invention provides a safety edge for the doors of trains, and the like, which is admirably well-suited to meet practical conditions of use, and otherwise fully accomplishes its intended objects.

Although the present invention has been described in some detail by way of illustration and example for purposes of clarity and understanding, it is understood that certain changes and modifications may be made within the spirit of the invention.

What is claimed is:

1. A door edge for attachment to a train door and the like and comprising an elongate hollow body of resilient flexible material having an inner wall for securement to a door, side walls extending from opposite sides of said inner wall away from a door, and an outer wall extending between said side walls remote from a door; said outer wall being generally sinuous in cross section and defining externally a longitudinally extending crest and adjacent trough; an elongate compression actuable switch assembly located longitudinally of and within said hollow body proximate to said outer wall for compression thereby; and a control web internally of said hollow body extending generally from said trough laterally to one of said side walls and swingable relative thereto for guiding said trough generally inwardly into compressing engagement with said switch assembly upon deflection of said crest by external force.

2. A door edge according to claim 1, said crest and trough being offset on opposite sides of a longitudinal centerline for complementary mating engagement with a like outer wall in inverted condition.

3. A door edge according to claim 1, said control web extending to the side wall adjacent to said crest and combining therewith to define an elongate nose chamber, and an elongate reinforcement member conformably engaging in said nose chamber and of a selected rigidity to achieve a desired sensitivity of switch assembly operation to crest deflection.

4. A door edge according to claim 3, said reinforcing member comprising a flexible tube having a cross section sized for engaging interior surfaces of said nose chamber.

5. A door edge according to claim 1, in combination with a pair of internal partitions in generally parallel spaced relation with each other and extending between opposite side walls respectively adjacent to said inner and outer walls, said switch assembly being conformably received between said outer wall and the adjacent partition for location close to said trough and responsive actuation thereby, the partition adjacent to said inner wall combining therewith to define a tubular region rigidified by securement to a door while the side wall portions between said partitions afford a resiliently flexible intermediate region of said hollow body.

6. A door edge according to claim 1, said switch assembly comprising a longitudinally extending channel facing toward said outer wall, a resiliently yieldable base in said channel, a first flexible conductor on said base facing toward said outer wall, a resiliently compressible spacer on said first conductor and having openings, a second flexible conductor on said spacer and facing through said openings to said first conductor, a resiliently yieldable outer cushion on said second conductor proximate to said outer wall, and an enclosure of impervious flexible sheet material encasing said switch assembly and defining a humidity seal.

7. A door edge according to claim 6, at least one of said flexible conductors comprising a flexible sheet of conductive foil having a multiplicity of creases for flexure with a minimum of internal stress, to enhance conductor life.

8. A door edge according to claim 6, said channel being relatively rigid and in retaining reception with said base.

9. A door edge according to claim 8, said channel being articulated for location in a non-straight hollow body.

10. A door edge according to claim 8, in combination with interfitting formations on said channel and base for positive retention of the latter by said channel.

11. A pressure sensitive switch construction comprising a resiliently compressible intermediate member having through openings, flexible conductive sheets on opposite sides of said intermediate member in facing relation through said openings, and outer cushions externally of said conductive sheets and deflectible to flex said conductive sheets into engagement with each other through said openings, at least one of said conductive sheets comprising a flexible backing, and a flexible facing having a multitude of folds and secured in facing relation to said backing throughout its facing surface excepting said folds being unsecured, said one conductive sheet being flexible with flexure of said facing being taken up by said folds for minimum internal strain and enhanced life.

12. A pressure sensitive switch construction according to claim 11, said conductive sheets having pleats defining said folds.

13. A pressure sensitive switch construction according to claim 11, said conductive sheets having creases defining said folds.

* * * * *